US007756277B2

(12) United States Patent
Andrews et al.

(10) Patent No.: US 7,756,277 B2
(45) Date of Patent: *Jul. 13, 2010

(54) DISTRIBUTED AUDIO SYSTEM

(75) Inventors: Leonard Colin Andrews, Sydney (AU); Andrew Chartres Goldfinch, Bondi Junction (AU)

(73) Assignee: Leisuretech Electronics Pty. Ltd., Rosebery, NSW (AU)

( * ) Notice: Subject to any disclaimer, the term of this patent is extended or adjusted under 35 U.S.C. 154(b) by 1134 days.

This patent is subject to a terminal disclaimer.

(21) Appl. No.: 11/350,773

(22) Filed: Feb. 10, 2006

(65) Prior Publication Data

US 2006/0126862 A1 Jun. 15, 2006

Related U.S. Application Data

(63) Continuation-in-part of application No. 09/485,657, filed on Mar. 24, 2000, now Pat. No. 7,181,023.

(51) Int. Cl.
*H04B 3/00* (2006.01)

(52) U.S. Cl. .............................. 381/77; 381/79; 381/80

(58) Field of Classification Search ................... 381/77, 381/79, 80; 700/94; 439/577
See application file for complete search history.

(56) References Cited

U.S. PATENT DOCUMENTS 3,195,067 A 7/1965 Klein et al.
3,370,125 A 2/1968 Shaw et al.
4,490,683 A 12/1984 Rhee
4,733,389 A 3/1988 Puvogel
4,809,339 A 2/1989 Shih et al.
4,979,217 A * 12/1990 Shipley ........................ 381/81
4,984,931 A 1/1991 Struthers et al.

(Continued)

FOREIGN PATENT DOCUMENTS

DE 44 34 469 5/1995

(Continued)

OTHER PUBLICATIONS

U.S. Appl. No. 60/666,380, Tarkoff et al.

(Continued)

*Primary Examiner*—Xu Mei
(74) *Attorney, Agent, or Firm*—Novak Druce + Quigg, LLP; Kenneth M. Fagin, Esq.

(57) ABSTRACT

A distributed stereo system includes two (or more) speakers; a source of audio signals; an amplifier in the same room as the speakers that drives the speakers; and a mains-operated electrical power supply to power the amplifier. The amplifier is remote from the signal source and power supply and is connected to the signal source and power supply by means of a category 5, four-pair twisted cable or similar, which provides right and left channel audio signals from the signal source to the amplifier and DC power from the power supply to the amplifier. A distributed intercom system features a bi-directional intercom hub; a mains-operated power supply; and two or more remote modules each having an amplifier and speaker. The modules are connected to the hub via category 5 cable or similar, which carries audio signals between the hub and the modules and power from the supply to the modules.

20 Claims, 10 Drawing Sheets

U.S. PATENT DOCUMENTS

| | | | | |
|---|---|---|---|---|
| 4,991,221 | A | 2/1991 | Rush | |
| 5,050,214 | A | 9/1991 | Lee | |
| 5,101,191 | A | 3/1992 | MacFayden | |
| 5,131,048 | A | 7/1992 | Farenelli et al. | |
| 5,164,991 | A | 11/1992 | Johnson et al. | |
| 5,175,770 | A | 12/1992 | Back | |
| 5,255,322 | A | 10/1993 | Farinelli et al. | |
| 5,332,976 | A | 7/1994 | Dunnebacke | |
| 5,361,381 | A | 11/1994 | Short | |
| 5,410,265 | A | 4/1995 | Jain et al. | |
| 5,546,468 | A | 8/1996 | Beard | |
| 5,579,397 | A | 11/1996 | Ikeda et al. | |
| 5,784,472 | A | 7/1998 | Ney et al. | |
| 6,038,425 | A * | 3/2000 | Jeffrey | 725/80 |
| 6,137,524 | A * | 10/2000 | Chea | 725/144 |
| 6,389,139 | B1 | 5/2002 | Curtis et al. | |
| 6,449,348 | B1 | 9/2002 | Lamb et al. | |
| 6,596,944 | B1 | 7/2003 | Clark et al. | |
| 2002/0026552 | A1 * | 2/2002 | Shah et al. | 710/317 |
| 2003/0023741 | A1 * | 1/2003 | Tomassetti et al. | 709/231 |
| 2006/0222153 | A1 | 10/2006 | Tarkoff et al. | |

FOREIGN PATENT DOCUMENTS

| | | | |
|---|---|---|---|
| EP | 777403 | A | 6/1997 |
| EP | 1 004 222 | | 5/2000 |
| FR | 2616288 | A | 12/1988 |
| FR | 2624332 | A | 6/1989 |
| JP | 6021693 | | 2/1985 |

OTHER PUBLICATIONS

Audio Systems Design and Installation, Phillip Giddings, 1990, pp. 318, 331, 337.

International Standard ISO/IEC 8877, Second Edition, Nov. 15, 1992, pp. 2,9.

"Twisted-pair cables for AES/EBU Digital Signals," D.G. Kirby, Audio Engineering Society 96th Convention, Feb. 26-Mar. 1, 1994, Amsterdam.

Jeff Cherum, "Scottish Rites Knekt Multi-room System," Home Theater, Mar. 1998 (whole document).

Gold, "Linn Knekt Multi-room System," Grammaphone, Dec. 1996, pp. 198, 200 (whole document).

Lloyd, "Multiroom hi-fi takes control of the home," Times of London, May 28, 1995.

"The Knekt System," via http://www.linn.co.uk/linn/ss/ssknt.html, Feb. 16, 1998; also see http://www.linn.co.uk/ss/ss_knt.reviews.html.

"MRS Multi-room Sound System," via http://www.midcoast.com.au/bus/me/Mrs.html, Feb. 16, 1998.

Wickelgreen, "The Facts About Firewire," IEEE Spectrum Magazine, Apr. 1997, pp. 20-25, especially Figs. 1, 2, p. 25.

Kumin, "ADA Multi-room audio system," Audio Video Interiors Magazine, Feb. 1994, 4 pages.

Lonstein et al., Sound & Video Contractor, "Distributed Sound Systems Come of Age," Dec. 20, 1993.

Langford-Smith, F., Ed., Radiotron Designer's Handbook, pp. 1198-1199 (1953).

QED Audio Products Ltd., "An Introduction to Streamline," Apr. 1988, Ashford, Middlesex, England.

QED Audio Products Ltd., Installation Manual, Issue One, Mar. 1989.

What Hi-Fi? Review of Multi-room system, Sep. 1988, table of contents and pp. 127 et seq., Teddington, Middlesex, England.

S4.3 Multi-room system, Installation Manual, undated prior art.

Linn Products Limited, Information Sheet, Knekt, Glasgow, Scotland, Mar. 1995.

What Hi-Fi? "Room Service," Jan. 1994.

Hi-Fi Choice, "Hi-Fi in Every Room," pp. 38 et seq., May 1995.

Australian Hi-Fi, "Jim Tate Stereo / Home of Linn Products," cover and pp. 29 et seq., undated prior art.

Knekt Installation Manual, Rev. 2.00, Nov. 18, 1996.

Command Systems Pty. Ltd., "UTP and Video Commander / ZCB0001," Brookvale, N.S.W., Australia, Nov. 14, 2000.

Belden Electronics Division, Cable and the Cutting Edge, Sydney, Australia, Jul. 1, 1997.

Sound & Video Contractor, "Distrubuted Sound Systems Come of Age," Dec. 20, 1993.

Stentor, Brochure, Trondheim, Norway, undated prior art.

"Room With a Clue," Home Entertainment, Dec. 1995, pp. 61, 63, 65.

"Multi-Room Sound Installation Considerations," Aug. 1994.

"Multi-Room Systems," Best Buys '95, pp. 88, 89.

"Design for Multi Room Display," Caringbah Hi-Fi Pty. Ltd., Feb. 1997.

Linn Products, Introduction, accessed via http://www.linn.co.uk/spec_sound/spec_sound.cfm on Jan. 26, 2006.

Linn Control, accessed via http://www.linn.co.uk/spec_sound/control.cfm on Jan. 26, 2006.

Linn Knekt, accessed via http://www.linn.co.uk/spec_sound/knekt.cfm on Jan. 26, 2006.

Knekt RCU, accessed via http://www.linn.co.uk/spec_sound/product_display.cfm? ProductID=36&activeNavBar=products&activeSubNavBar=Knekt on Jan. 26, 2006.

Knekt RCU Specification, accessed via http://linfo.linn.co.uk/binaries/A9D547CF-3D72-4532-988D94E8B2D44D9C/Knekt_RCU_InfSht_lores.pdf on Jan. 26, 2006.

Knekt Multi-room Owner's Manual, accessed via http://linfo.linn.co.uk/binaries/B8E1EB21-C738-4663-A9A21629A523F6EA/Knekt_owner_manl_ENGLISH_rev3.pdf on Jan. 26, 2006.

Knekt Intersekt, accessed via http://www.linn.co.uk/spec_sound/product_display.cfm? ProductID=37&activeNavBar=products&activeSubNavBar=Knekt on Jan. 26, 2006.

Knekt Intersekt Specification, accessed via http://linfo.linn.co.uk/binaries/C2ABBB4F-6723-4526-9A8F665B77E94D40/intersekt_info_rev2.PDF on Jan. 26, 2006.

Knekt Line Driver, accessed via http://www.linn.co.uk/spec_sound/product_display.cfm? ProductID=38&activeNavBar=products&activeSubNavBar=Knekt on Jan. 26, 2006.

Knekt Line Driver Specification, accessed via http://linfo.linn.co.uk/binaries/64D115E8-9FE5-44BF-8FF2ABD1167F0E24/LINE_DRIVER_SPEC_SHEET.pdf on Jan. 26, 2006.

Knekt Line Receiver, accessed via http://www.linn.co.uk/spec_sound/product_display.cfm? ProductID=39&activeNavBar=products&activeSubNavBar=Knekt on Jan. 26, 2006.

Knekt Line Receiver Specifications, accessed via http://linfo.linn.co.uk/binaries/5A295169-2B0D-11D4-8DFF009027D395C0/linereceiver_info.pdf on Jan. 26, 2006.

Knekt Roomamp, accessed via http://www.linn.co.uk/spec_sound/product_display.cfm? ProductID=41&activeNavBar=products&activeSubNavBar=Knekt on Jan. 26, 2006.

Knekt Roomamp specification, accessed via http://linfo.linn.co.uk/binaries/91E0F632-1A81-4783-B719435AF04A91B8/roomamp_info_rev2.pdf on Jan. 26, 2006.

Knekt Roomamp Press Release, Jul. 1997, accessed via http://www.linn.co.uk/news/press_release_viewer.cfm?PressReleaseUUID=67317FB9%2DFE46%2D11D3%2DBEE70090279FE9F8 on Jan. 26, 2006.

Knekt Sneaky Driver, accessed via http://www.linn.co.uk/spec_sound/product_display.cfm? ProductID=165&activeNavBar=products&activeSubNavBar=Knekt on Jan. 26, 2006.

Knekt Line Driver specifications, accessed via http://linfo.linn.co.uk/binaries/9574EF1D-0C07-11D6-A3640002B33574A8/linedriver_info.pdf on Jan. 26, 2006.

Knekt Sneaky Receiver, accessed via http://www.linn.co.uk/spec_sound/product_display.cfm?ProductID=166&activeNavBar=products&activeSubNavBar=Knekt on Jan. 26, 2006.

DU3 Users Guide, PD-101-4-96, undated prior art.
"High quality media over LANs without sacrificing bandwidth," Audio Media, Jul. 1997, p. 30.
Home Entertainment Australia Magazine, Issue No. One, 1977 (cover plus five selected advertisement pages).
The Knekt System, printout from https://www.linn.co.uk/linn/ss/ss_knt.html dated Feb. 16, 1998, from 4:31 PM to 4:40 PM, four web pages' worth of material (11 pages total).
MRS Multi Room Sound Installation Considerations, Aug. 10, 1994.
On-Q/Legrand, Premium Intercom Flyer Rev. 0, dated Nov. 2005.
On-Q/Legrand, Premium Music Flyer Rev. 0, dated.
Opinion, Armour vs LeisureTech Electronics, Case Nos. H C2007 C01407, HC 2007 C016373, Royal Courts of Justice, Strand, London, Nov. 14, 2008 (Not Prior Art).

* cited by examiner

*Analogue audio-video or digital

DISTRIBUTED AUDIO SYSTEM

CROSS-REFERENCE TO RELATED APPLICATIONS

This application is a continuation-in-part of, and claims priority from, U.S. patent application Ser. No. 09/485,657 filed Mar. 24, 2000 (now issued as U.S. Pat. No. 7,181,023 on Feb. 20, 2007), the entire contents of which are incorporated herein by reference. That application was based on and claims the priority benefit of Australian Patent Application PO 8621, filed Aug. 15, 1997, and PCT Application PCT/AU98/00647, filed Aug. 14, 1998.

FIELD OF THE INVENTION

This invention concerns a distributed audio system that may be used to provide sound to several rooms or areas from a single source of audio signals or to route sound from one room or area to another via a central hub.

BACKGROUND

A typical stereo audio system comprises several audio signal sources such as a CD player and a tuner. The source units are generally arranged in a stack together with a selector and amplifier unit. In use, a signal from a selected source is amplified and provided to speakers which are typically located some distance away from the unit within the same room. The system controls are manually operable switches and dials on the signal sources and amplifier. There is sometimes a hand-held control device which is used to transmit infrared signals to the selector and amplifier unit.

In sophisticated systems several sets of speakers may be mounted in different rooms throughout a house. Sometimes the selector and amplifier unit will be provided with switches to enable different sets of speakers to be activated and deactivated. To power multiple speakers from a single amplifier an impedance matching device is also required.

The amplifier's volume control, which controls the volume level in the main room, also controls the volume level of the speakers in remote rooms. The remote rooms may have an attenuator device to reduce volume level but this attenuator can only reduce the volume below the level set by the amplifier. The attenuator cannot increase the amplifier's output.

The quality of the components and the weight and quality of the cabling can easily affect the quality of the sound output by the speakers. These systems also require specialist knowledge in the installation of the cabling and the audio components.

SUMMARY OF THE INVENTION

The invention is a distributed audio system.

In one embodiment, the invention features a distributed stereo system that includes two or more speakers for the broadcast of stereo audio signals; a source of stereo audio signals (i.e., a central audio unit); a stereo amplifier to amplify stereo audio signals and drive the speakers; and a mains-operated electrical power supply to provide power to the amplifier. The amplifier is located in the same room as the speakers and remote from the signal source and power supply. The amplifier is connected to the signal source and power supply by means of a category 5 four pair twisted cable or similar (as defined below), which provides, in respective conductors of the twisted pairs, right channel audio signals from the signal source to the amplifier, left channel audio from the signal source to the amplifier, and DC power from the power supply to the amplifier.

The right channel audio, left channel audio, and DC power may be provided in respective twisted pairs.

This system enables decentralisation of amplification and permits the amplifier to be installed remote from the signal source and close to the speakers, reducing speaker cable loss and increasing total system damping factor. The remote amplifier does not need to be positioned close to a voltage source since it receives its power via the category 5 (or similar) four pair twisted cable.

The cabling is very simple and easy to install. One CAT5, or similar, cable connects the source of audio signals to each room or zone. This cable carries audio signal, system power, and if required, data and status. Digital systems can also carry video transmission. More of the cables can be laid in parallel if higher power or bi-amplification is required.

The cabling can be adapted to many different configurations. It is possible to install it into every major room in new homes. Once the cabling is installed the system can be configured in many different ways. It could start as a one-room system and be changed and upgraded to an audiophile standard multi-zone system feeding individual source selection to each room utilising the same cabling.

The cabling is capable of adapting to new technologies and system upgrades without the need to re-cable when upgrades are required; for instance, it can also be used to transmit digital audio, video and control commands.

Remote amplifier and speaker sets may be positioned in several rooms and may receive signals from a single source of audio signals. Where the source provides a selection of components such as radio or CD, it is also possible for different audio signals to be provided to different rooms. The volume may be set differently, up or down, in each room.

The remote amplifiers may be integrated circuit amplifiers. As a result of not requiring built-in power supplies they may be compact, and they may be constructed to fit into a standard electrical light switch housing or be incorporated into a speaker box or in-wall or in-ceiling speaker. A suitable example is the Silicon Monolithic, Bipolar Linear Integrated Circuit, TA8216H, dual audio power amplifier.

The remote amplifiers can be powered by low cost plug packs or by dedicated audiophile power supplies located at the audio source, where mains power is easily accessible.

The remote amplifiers' output levels may be controlled by the output levels of the source components, or a manual volume control maybe included with respective remote amplifiers. Alternatively, a hand-held remote control may be provided for volume control, among other things. In this case, the remote control may transmit infrared signals to a receiver mounted with a remote amplifier. Where a remote amplifier is mounted inside a standard electrical light fitting the fascia plate may include an infrared receiver. The fascia plate may also include status indicators for the amplifier and the audio signal source components.

Infrared signals received by a remote amplifier may be transmitted to the source components through a fourth twisted pair in the category 5 (or similar) cable. The signals may be modulated before transmission to an infrared emitter which directly controls the audio components, or they may be demodulated and provided as data signals to those components.

The system can also carry control data in the single cable to control other remote controllable items which are located in the same areas or those which can be incorporated into the single wiring system. Many domestic appliances are controlled by infrared remote control. The remote infrared receivers may relay commands for all infrared devices operating between 38-56 kHz.

The remote amplifiers may accept standard line level signals from the audio source components, or speaker outlet of a master amplifier which may be matched to the audio source, or sources, and may be located with them. In other words, the remote amplifiers may be driven by either a low impedance (4 to 16 ohm) speaker level signal, or high impedance (10 k ohm) line level signal.

The remote amplifiers may include a switchable system for disabling the audio amplifier device to conserve power and to reduce the audio output from the speakers to a low or zero output when not required, and they may include an adjustable input level trim device.

A high input impedance at the remote amplifiers will cause any inducted line signals to be conducted back to the lower impedance of the audio source, reducing induced system noise at the amplifier. High impedance will also allow many remote amplifiers to be run from a single audio source with no sonic detriment. Multiple pairs of speakers may be driven from a single audio source in this way without the need for speaker impedance matching devices.

The output from the remote amplifiers is sufficient to drive a pair of hi-fi speakers, 4 to 16 ohm, at a reasonable sound level for most domestic requirements; typically 90-100 dB unweighted. The remote amplifiers do not require fused output protection.

In another embodiment, the invention features (i.e., the distributed audio system constitutes) an intercom system, which permits bi-directional audio communication. According to this embodiment of the invention, the central audio unit is an intercom hub, which receives power from a mains-operated power supply. Two or more remote modules are located throughout the building being served by the intercom system (e.g., in various rooms and/or at various doors), with each module having a speaker and a microphone. The speaker and the microphone within each module are connected to the intercom hub via category 5 (or similar) four pair twisted cable. One of the twisted pairs in each length of cable carries analog or digital audio signals between the intercom hub and the speaker in the associated remote module, and another one of the twisted pairs in each length of cable carries power from the mains-operated power supply to the speaker.

BRIEF DESCRIPTION OF THE DRAWINGS

Examples of the invention will now be described with reference to the accompanying drawings, in which.

DETAILED DESCRIPTION

Figure 1:
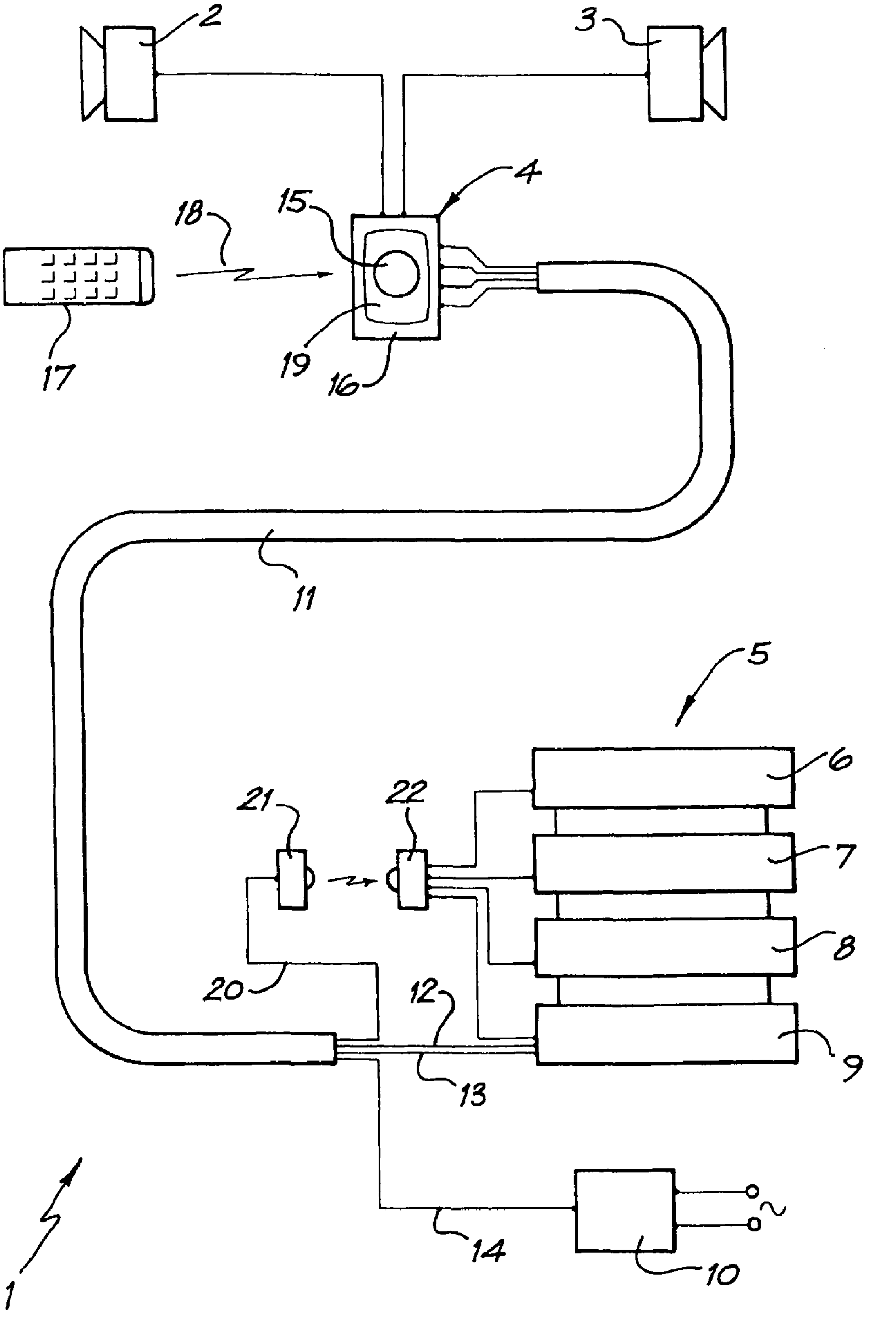
FIG. 1 is a schematic diagram of a first example of a distributed stereo audio system according to the invention.

Referring first to FIG. 1, a distributed stereo audio system 1 in accordance with the invention comprises two speakers 2 and 3 connected to an amplifier 4. The amplifier 4 is housed in a standard electrical light switch housing in the same room as the speakers (or, in some implementations, adjacent to or attached to one of the speakers).

In another room, a central audio unit, namely, a source of audio signals 5 comprises a CD player 6, a tape recorder 7, a VCR 8 and a source selector 9. A power supply 10 provides power from the mains to each amplifier 4.

The amplifier 4 is connected to the signal source and power supply 10 by means of a category 5 (or similar) four pair twisted cable 11. One of the twisted pairs 12 provides the right audio signal from the source to amplifier 4. Another twisted pair 13 provides the left audio signal. A third twisted pair 14 provides power from power supply 10 to the amplifier 4.

In use, amplifier 4 amplifies the left and right standard line level signals and supplies them to the speakers 2 and 3 respectively. The amplifier is controlled by operation of a potentiometer 15 mounted on its fascia plate 16 or by other suitable push-button control that would be understood by one having skill in the art.

Amplification may also be controlled by means of a hand-held remote controller 17 which transmits infrared signals 18 to a receiver 19 mounted in fascia plate 16. The fascia plate may include displays indicating the status of the amplifier and, if required, the components of the source. The fascia plate may also be used as a key-pad to transmit control commands to the sources.

Infrared signals may be transmitted, either before or after demodulation, from amplifier 4 back to source 5 using the fourth twisted pair 20 in category 5 (or similar) cable 11. The infrared signals may be used to control the source directly. Alternatively, they may be used to retransmit the control signals using transmitter 21 to an infrared receiver 22 associated with the source.

Amplifier 4 is designed around a single chip amplifier, and has high input impedance. This enables several amplifiers to be mounted in different rooms to amplify signals from the same source 5 for speaker sets in each of those rooms. The Silicon Monolithic, Bipolar Linear Integrated Circuit, TA8216H, dual audio power amplifier is used for this purpose.

In each room, the sound broadcast may be from the same component of the source or from different components of the source. Further, the amplification level may be different in each room.

Figure 2:
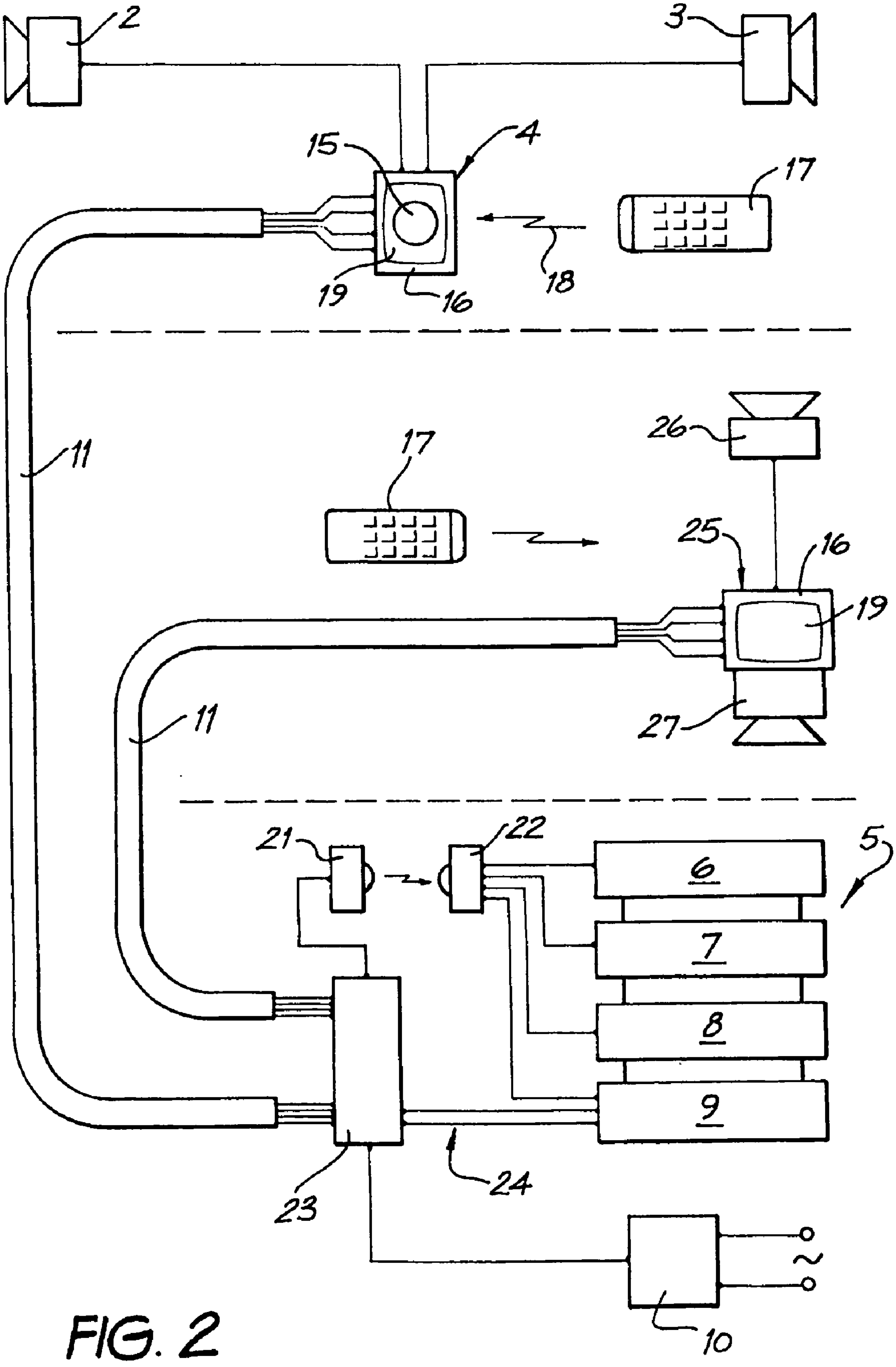
FIG. 2 is a schematic diagram of a second example of a distributed stereo audio system according to the invention.

Referring now to FIG. 2, a slightly more complicated system will be described. In this system, a connecting block 23 is used to interconnect the source of audio signals 5 (i.e., the central audio unit), the power supply 10, several category 5 (or similar) four pair twisted cables 11 (two of which are shown), and the infrared emitter 21. The source selector 9 provides audio input at line or speaker level to the block 23 along lines 24. The block then outputs these signals to respective twisted pairs of the cables 11, together with electrical power. One of the cables is connected as before, but the other terminates in an amplifier 25 mounted with one of a pair of ceiling mounted speakers 26 and 27 in another room. This amplifier module may be equipped with an infrared receiver 19 in its facia plate, and control signals may be transmitted back to base as before.

Although a distributed stereo system according to the invention has been described with reference to a particular example, it should be appreciated that it may be exemplified in different forms. For instance, the source audio signal can come from a main amplifier or any line level output or amplifier speaker output. It can even have its own input switching or work in parallel with line level outputs connected to an amplifier. A line driver of some kind may be used but it is not necessarily required. No impedance matching devices are required. For more sophisticated systems each remote amplifier may have its own source selection but this is not necessarily required.

During construction of a new building a facility for stereo broadcast can be economically installed into every major room. A four pair twisted cable (CAT5 or equivalent) is laid from a common control point to a point in each room where a remote amplifier may be installed. A loop wiring system may be used, however, this is not preferred since it may restrict the system's flexibility and power capability. Short lengths of speaker cable may be installed to speaker points in the walls or ceilings or wired directly to the speaker terminals. Using this cabling it is possible to install a remote amplifier into any room as and when required. More sophisticated multi-zone systems can be installed using the same cabling system.

Wiring at each end of the cable is a simple 8 way colour encoded connection. (It can also be a standard plug connector.) No consideration has to be given to impedance matching, multiple modules can be run from the main system amplifier or a dedicated input selector or a single source component, e.g., a CD player via line level. The volume level is infinitely variable and the main systems volume level does not affect the speakers in remote rooms. No remote mains power source is required.

A connecting block may be provided to interconnect the power supply, audio signal sources, main amplifier, infrared emitter to control the local sources and the remote amplifier and speaker sets. A four pair twisted cable (CAT5 or similar) is used to connect the connecting block with every remote amplifier.

Since the parent of this patent was filed, the flexibility of a distributed stereo system according to the invention has been demonstrated by numerous installations under the trade name A-BUS. A few such A-BUS systems are illustrated schematically in FIGS. 3-6. Once a building (e.g., a house) is wired for an A-BUS system, it has unique flexibility. The homeowner can start with a simple system and expand or upgrade relatively easily. All products on the market bearing the A-BUS logo are required to comply with A-BUS standards to ensure compatibility.

Figure 3:
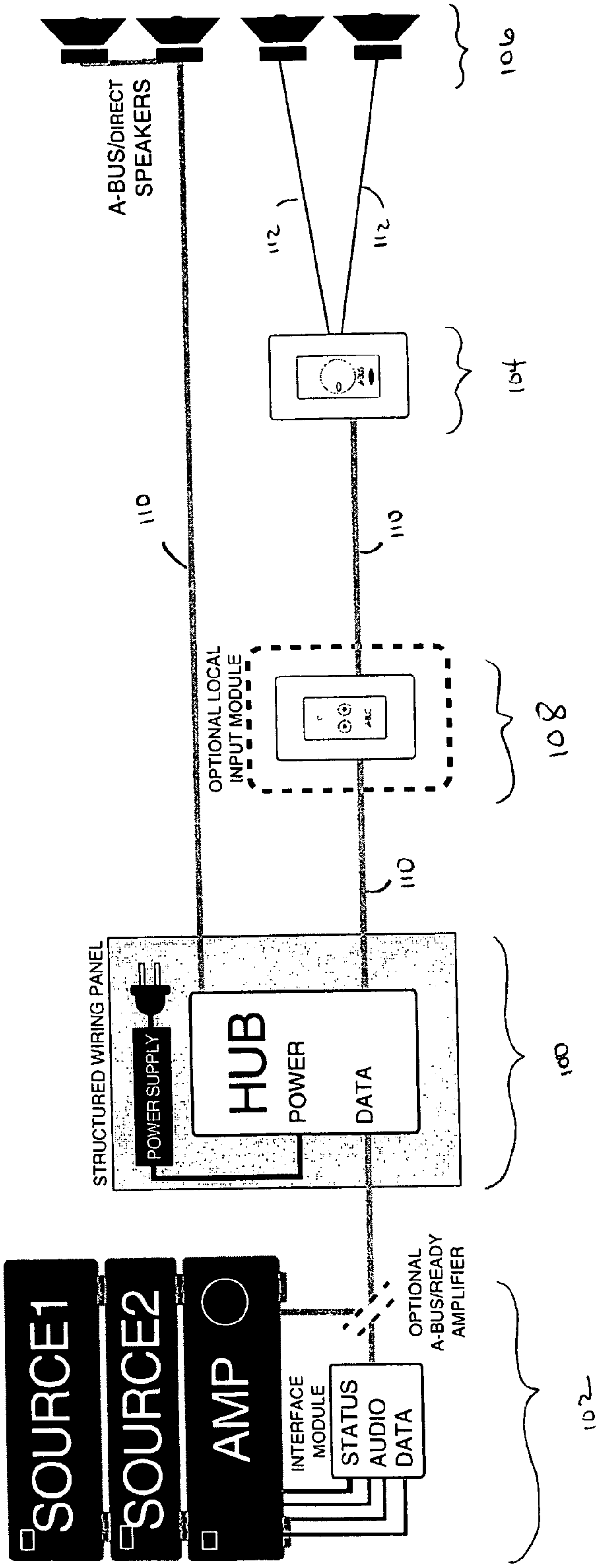
FIGS. 3-6 are schematic diagrams illustrating various further arrangements of a distributed stereo audio system according to the invention.

With reference to FIG. 3, distribution hub 100 is the center of the system and is located in a structured wiring panel. Audio, infrared data, and status information is fed to or from the main system and infrared data to or from the main system is fed back via a single category 5 or similar cable. Hubs have an output port for each zone (room). If more output ports are required, most hubs have expansion ports to enable connection of multiple hubs. Each hub has its own power supply.

With respect to the source(s), it (they) can be "standard" or already A-BUS compliant. In particular, any home entertainment source such as receivers, CD/DVD players, cable boxes, satellite receivers, etc. can easily feed an A-BUS system by first going through an interface module, where the system's audio (via tape or second zone output) and status are sent to the distribution hub 100, along with infrared data to control input selection and to control source components. Alternatively, some component manufacturers now include an A-BUS output port for direct connection of audio, infrared data, and status to a hub 100, thus eliminating the need for a separate interface module.

Power modules 104 are located in each room (zone), close to or on the speakers. Each power module incorporates a stereo amplifier to provide individual power for that room. Power modules may also include an infrared receiver to control volume and relay commands to the source components. Keypad style modules also include touch button commands.

With respect to speakers 106, A-BUS is compatible with most in-wall and in-ceiling speakers. A-BUS sends high-quality audio signal to each room, thus ensuring excellent clarity and image. If the speaker is A-BUS DIRECT, the power module 104 is built into the master speaker, which also includes an IR receiver to control volume and to relay commands to the source components via remote control. A-BUS DIRECT speakers are connected directly to the hub 100 via a single category 5 or similar cable, or even directly to the A-BUS output of an A-BUS-ready amplifier.

Furthermore, local input modules, which are optional, make it simple to enjoy any local entertainment source in a particular room (zone). When placed between the hub 100 and a particular power module, the local input module 108 provides a local input source for that room. The audio output from the local television, computer, MP3 player, etc. is sensed automatically and automatically switches the A-BUS input to that room when turned on.

As in the previously illustrated embodiments, only one category 5 cable 110, or similar, is required from the hub 100 to each power module 104. This one cable carries audio signals, system power, IR data, and status indication. (To better isolate noise from the data line, the audio line level may be increased from 1.0 volts, as was practiced previously, to 2.5 volts.) Speaker cable 112 is required from the module 104 to the speakers 106. If, on the other hand, A-BUS DIRECT speakers are used, they are connected directly to the hub 100, or even directly to the A-BUS output of an A-BUS-ready amplifier, as noted above.

Figure 4:
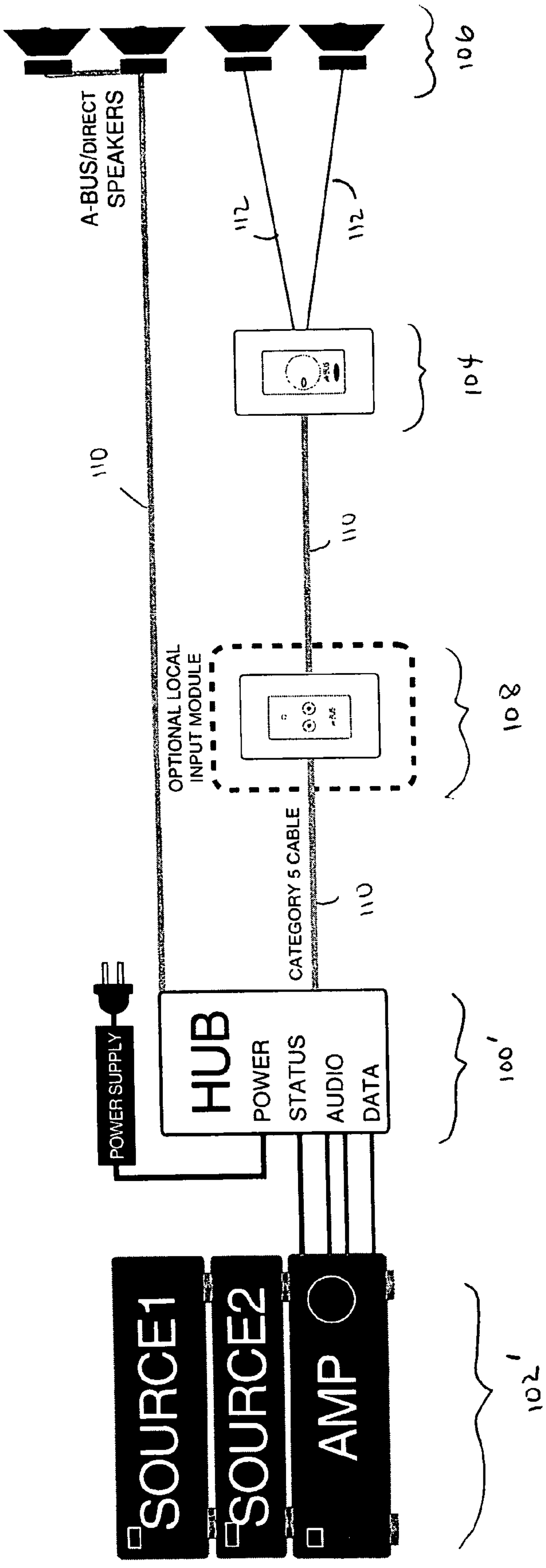

A similar configuration of an A-BUS system is illustrated in FIG. 4, where the same components are labeled with the same reference numerals and similar components are labeled with "primed" reference numerals. In this arrangement, the amplifier in the source 102' is A-BUS ready, and thus has an A-BUS port for direct connection of audio, IR data, and status to hub 100'. (For other amplifiers, the tape or second zone outputs are used for audio.) The amplifier can be used for source selection, or source selection can be provided by a separate input switcher (not shown) connected directly to the source components.

Figure 5:
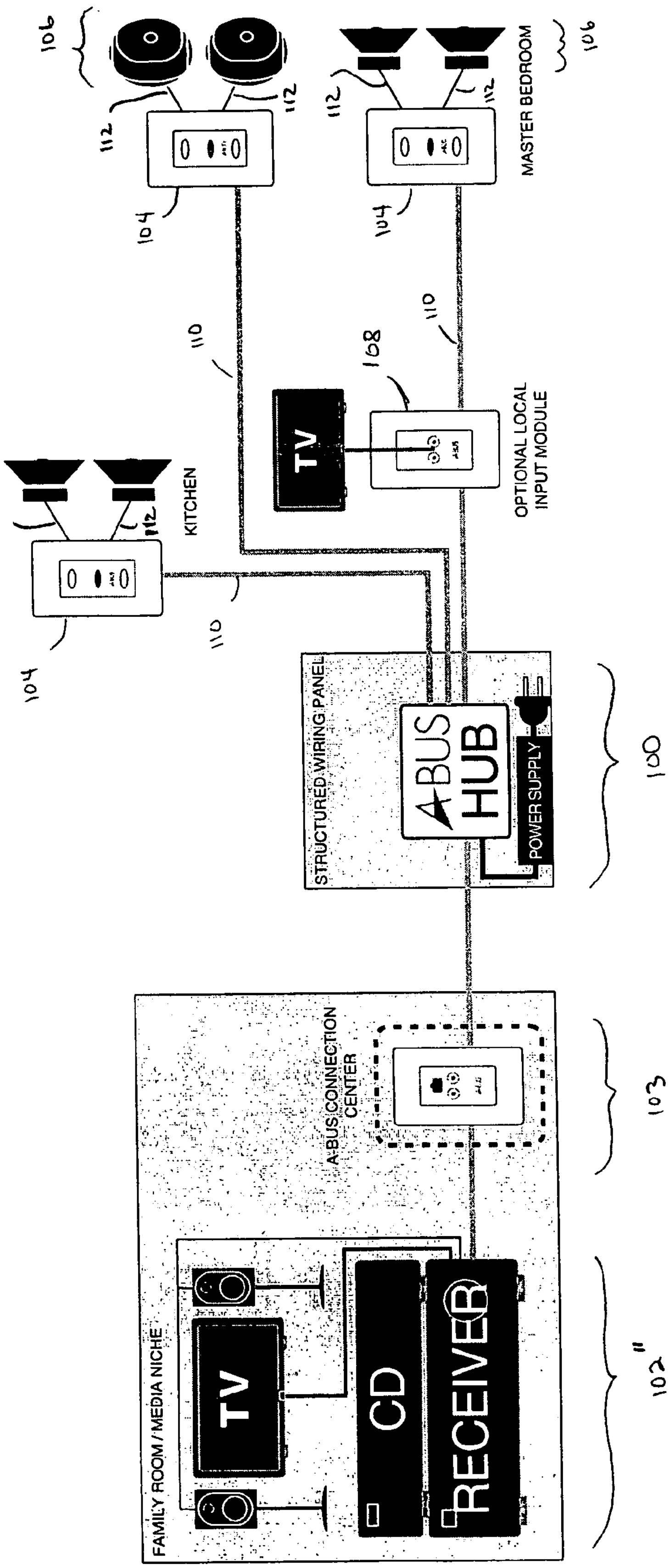

Somewhat more expansive, a "whole-house" A-BUS system is illustrated in FIG. 5. Again, components that are the same as in FIGS. 3 and 4 are labeled with the same reference numerals, and components that are similar are labeled with double-primed reference numerals. In the system shown in FIG. 5, the receiver and source of "media niche" 102" feed the home theater system in the family room and plug into the A-BUS connection center 103 in the wall to provide audio to the rest of the house. Connection center 103 will connect any receiver to the "whole-house" A-BUS system.

Figure 6:
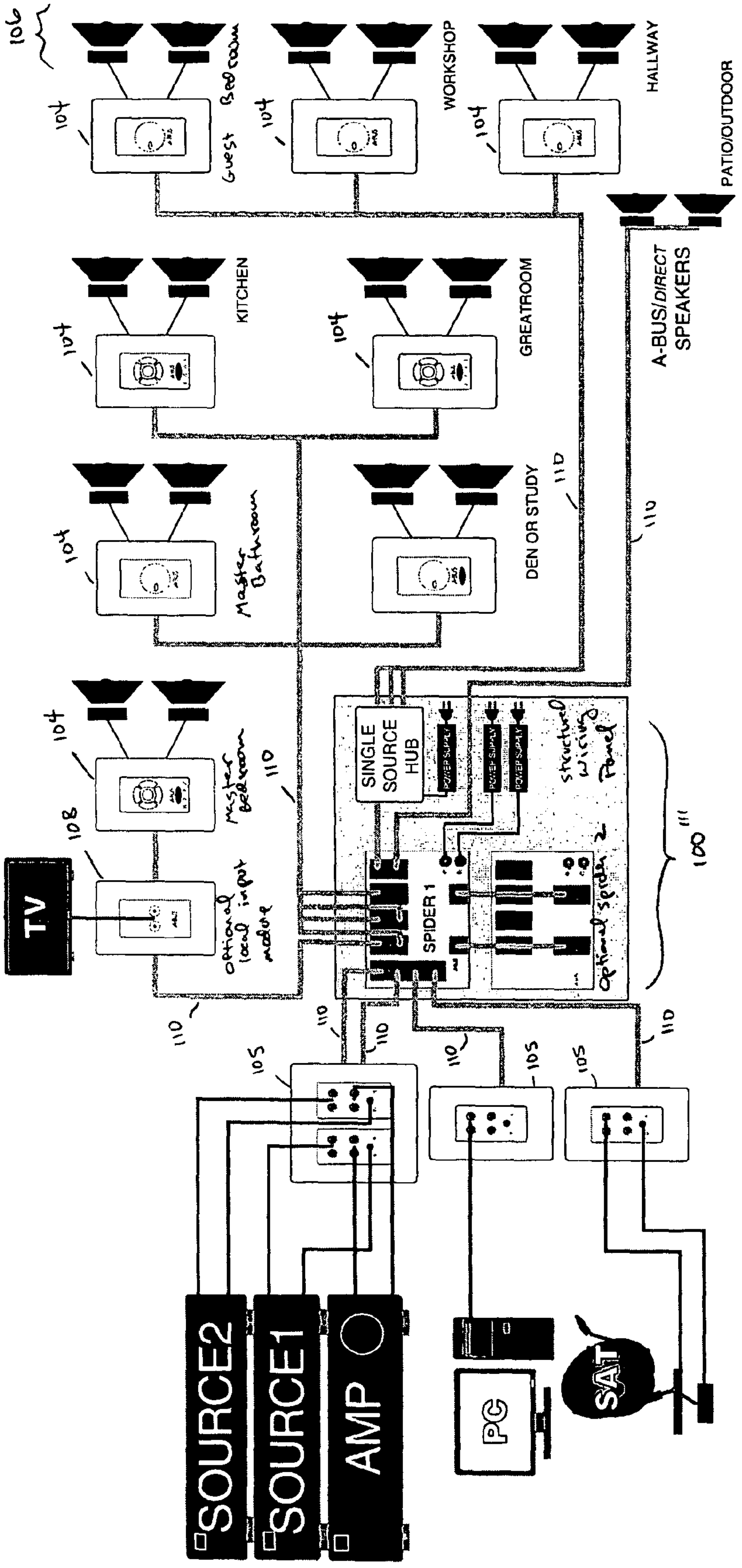

Utilizing the flexibility of the A-BUS system to the extreme, an exemplary multiple-source A-BUS system is illustrated in FIG. 6, where components that are the same as those illustrated in FIGS. 3, 4, and 5 are labeled with the same reference numerals, and components that are similar are labeled with triple-primed reference numerals. In this system, source input modules 105 enable the A-BUS system to access audio sources anywhere in the home (MP3 player in one room, computer in another, satellite receiver near the structured panel, etc.). All of these sources connect easily via a single category 5 cable (or similar) 110 to the "spider" in the structured panel 100''', which spider increases the number of rooms or zones that may be served by an A-BUS audio system.

Figure 7:
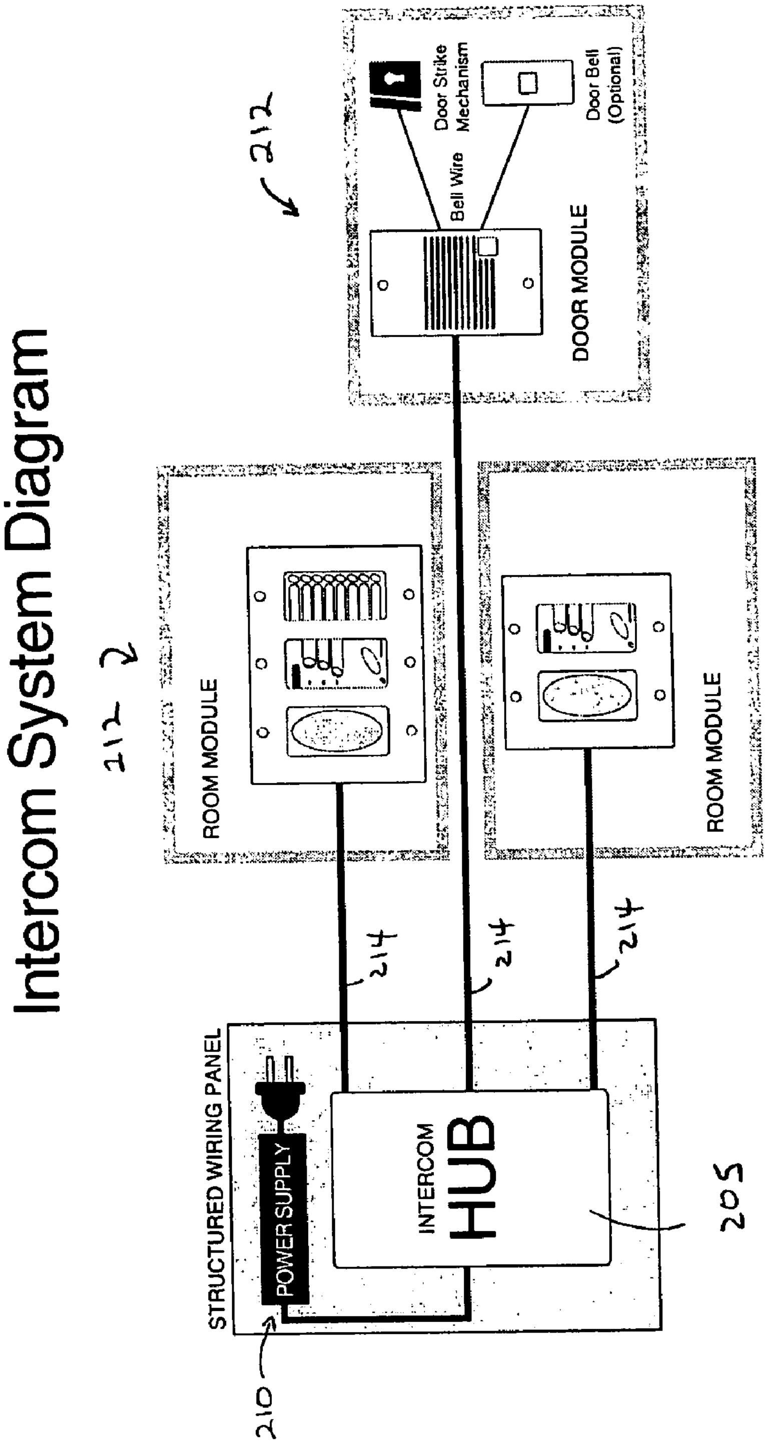
FIG. 7 is a schematic diagram of a distributed intercom system according to the invention.
Figure 8:
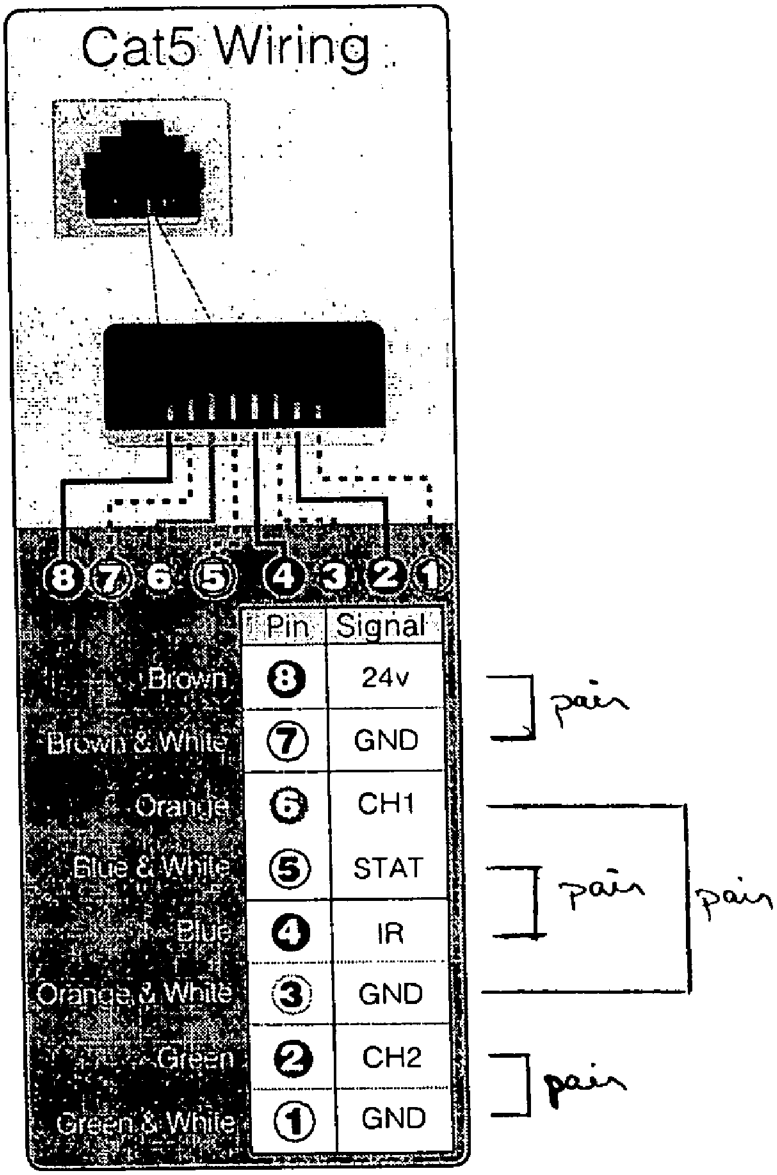
FIG. 8 is a schematic diagram identifying the signals/voltages carried on the various wires in the cables shown in FIG. 8.
Figure 9:
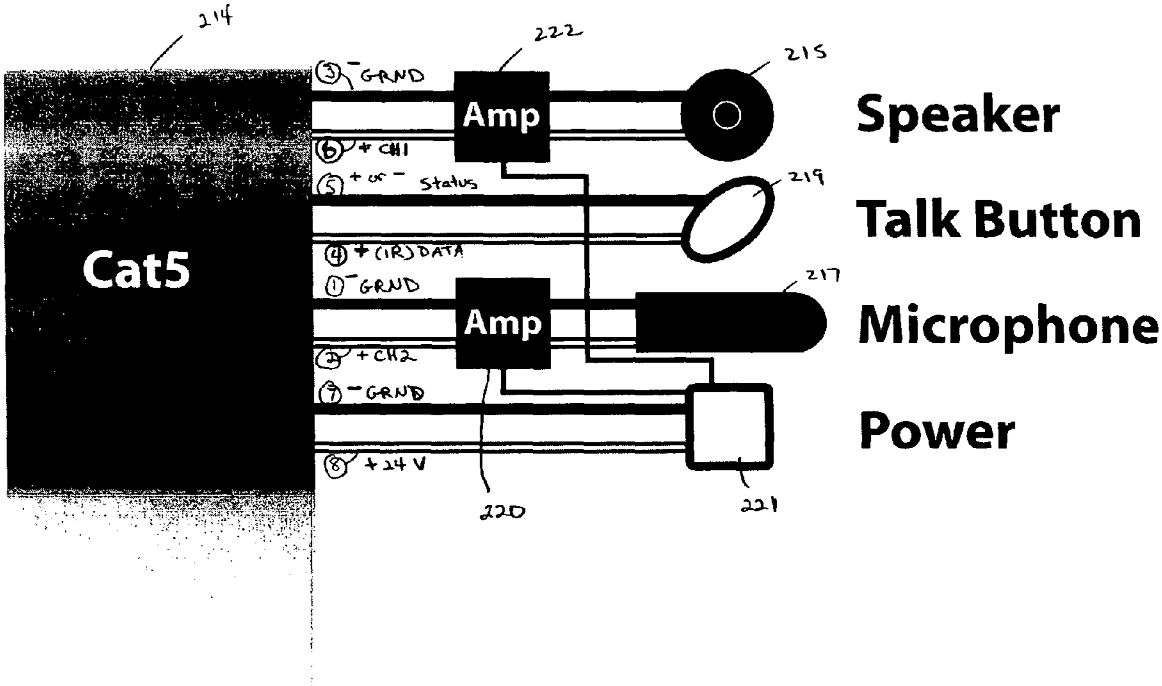
FIG. 9 is a schematic diagram illustrating in greater detail components of the modules shown in FIG. 7 and their associated wiring, as illustrated in FIG. 8.

In another embodiment, the invention features a distributed intercom system, as illustrated schematically in FIGS. 7-9. In this embodiment of the invention, the central audio unit is a bi-directional intercom hub 205, which is powered by mains-operated power supply 210. Two or more remote modules 212—remote in the sense that they are located in rooms or at locations (e.g., at a doorway) away from the central audio unit 205—are distributed throughout the building being served by the intercom system to allow communication between various remote locations. Each of the remote modules includes a speaker 215, a microphone 217, a talk button 219, and (optionally) a local power distribution device 221.

Various components within the remote modules are connected to the intercom hub 205 by category 5 cable 214 or similar. One twisted pair in each length of cable 214—e.g., wires 1 and 2, as illustrated in FIGS. 8 and 9—carries audio signals from the microphone 217 to the intercom hub 205. (The circled numbers 1-8 in FIG. 9 correspond to the wire numbers/RJ-45 jack pin numbers shown in FIG. 8 and should not be confused with the reference numbers 1-8 in FIGS. 1 and 2.) Another twisted pair—e.g., wires 3 and 6, as illustrated in FIGS. 8 and 9—carries audio signals from the intercom hub 205 to the speaker 215. DC power from the mains-operated power supply 210 is provided through the cable 214, e.g., along wires 7 and 8, and provides power to the microphone 217 via microphone amplifier 220 and to the speaker 215 via speaker amplifier 222.

Precisely speaking, audio signals travel from the bi-directional intercom hub 205 to speaker amplifier 222, and amplified audio signals travel from the speaker amplifier 222 to the speaker 215. Similarly, precisely speaking, audio signals travel from the microphone 217 to microphone amplifier 220, and amplified audio signals travel from microphone amplifier 220 to intercom hub 205. Furthermore, precisely speaking, power is provided to the microphone and speaker amplifiers 220 and 222. More broadly speaking, however, it may be said that audio signals are carried to the speaker along one twisted pair; audio signals are carried from the microphone to the intercom hub along another twisted pair; and power is carried to the speaker and to the microphone along a third twisted pair. (This broader nomenclature may also be adopted with respect to the distributed stereo audio systems illustrated in FIGS. 1-6 and described above, i.e., it may be said that the category 5 (or similar) cabling carries left and right audio signals in respective twisted pairs to the speakers (via associated amplifier(s)) and that power is also carried to the speakers in a twisted pair.)

In addition to sound and power, the cabling 214 may also carry other signals, such as in the form of bi-directional serial communications, along the fourth twisted pair—e.g., (IR) data wire 4 and status wire 5, as illustrated in FIGS. 8 and 9. For example, FIG. 9 schematically illustrates press-to-talk button 219 as connected to the fourth twisted pair to indicate that a signal (i.e., data) is sent to the hub along that pair, to alert the hub that someone is about to speak into the microphone 217, when the button 219 is depressed. Signals would be sent to the hub upon depressing any other button on the module along the same fourth twisted pair, and signals are sent from the hub to the module along the fourth twisted pair. These serial communications signals can be in the form of numerical tokens that are sent and received to and from the intercom hub to form an event driven control and operating system. Sending a token to a hub (from an intercom module) may configure the audio routing network for the desired audio interconnection path(s). Tokens received from a hub (by an intercom module) may be interpreted to be controlling signals for status lamps and indicators, door latch controls, or similar.

The data line is a powerful facility. In a highly integrated system, data being transmitted may also include control commands for other associated technologies/devices that need to be controlled from a remote location, e.g., the data line may be used to control video, cable, satellite, HVAC, security systems, etc. Because the data line is bi-directional, the data may travel in both directions, for monitoring purposes.

The intercom system of the invention is totally event driven using a messaging system driven by a real-time operating system in the hub 205. The hub 205 can be "taken over" by any of the remote modules if the remote module has the capability to do that (e.g., alarm systems, etc.). All remote modules communicate with the hub 205 and hence with each other using the STATUS line of the cable 214 (e.g., wire 5, as illustrated in FIGS. 8 and 9) as a party line ("wired OR") configuration. Additionally, the remote devices or modules may send or receive IR commands on the cable's IR line (e.g., wire 6) to control third-party devices, if required.

Whenever a remote module is connected to the hub 205 for the first time, a unique ID code is generated for that module by the hub. During this identification process, the module that has been given its new ID saves the ID number (as well as the hub 205), and the device sends a "capabilities" list to the hub so the hub knows how to interact with the device.

Whenever a button is pressed anywhere within the system, if it is not handled by the remote device or module, a message is sent to the intercom hub 205, identifying where the signal originated and what the button number is. (It is anticipated that each remote module may have up to 256 buttons.) Furthermore, whenever a lamp needs to be turned on at a given remote module, the intercom hub 205 sends a message to the remote module specifying which lamp is to be turned on, and any flashing information. (Flashing is controlled locally within each remote module.)

The intercom hub 205 is a relatively straightforward device, with a number of separate control systems or functions. In its primary capacity, the intercom hub 205 operates as a cross-point switch. In this regard, the hub 205 is analogous to a manual telephone exchange, where an operator would plug a patch cord into a socket matrix to connect one party to another. As noted above and reflected by FIGS. 8 and 9, two of the four twisted pairs in each length of cable 214 provide bidirectional signal lines (channels 1 and 2), which can carry analog or digital audio or video signals in either direction. If one considers the cross-point switch to have 16 "X" lines and 16 "Y" lines, each of the remote modules "occupies," for instance, Xn and Xn+1. For example, one room would occupy X0 and X1; the next room would occupy X2 and X3; etc. The "Y" axis lines may be connected to various audio, digital, or video signal sources, and additionally, pathways for a chime sound generator, external audio input, one or more door unit devices, an optional audio message recording device, and provision for future devices. With this configuration, one or more "X" paths may connect to any of the "Y" paths. Additionally, any "Y" paths that are not committed to a signal input can be utilized for communication between "X" units as a party line configuration. Each spare "Y" line allows any of the "X" lines to utilize a party line situation, so multiple communication paths may be configured between any "X" units.

The bi-directional central hub uses a system of dynamic routing, meaning that the central hub not only configures itself for the type of remote module connected to it (intercom module, volume control module, or other), but it will also switch the required audio signal paths as determined by a dynamically altering lookup table that controls the crosspoint switch directions, and also enables the required volume control module(s) and intercom module(s).

The bi-directional intercom hub 205 also (optionally) functions as an IR command processor. In particular, each remote module sends raw (modulated or demodulated) data down the IR line (wire 6 in FIGS. 8 and 9) at 4v amplitude to the IR processor. The IR processor provides control signals to the microprocessor controlling the cross-point switch, allowing control of the system remotely, and provides A-BUS compatibility for switching A-BUS ready sources.

Furthermore, the intercom hub 205 processes serial communications sent and received on the status line to orchestrate the control of the cross-point switch depending on the user's action at each remote module. All data is sent on the status line (wire 5 in FIGS. 8 and 9) as a "wired OR" party line. A special messaging system has been developed for communication on this line.

Special chime sounds and audio recording system (optional). Provision has been made for using "real audio" sounds such as chime sounds, barking dog, etc., when a door unit's bell push is activated. These can be recorded by the end user or factory fitted.

Network capability (optional). Provision has been made for communication with external systems to extend the intercom's capabilities and to allow security alarm functions.

Figure 10:
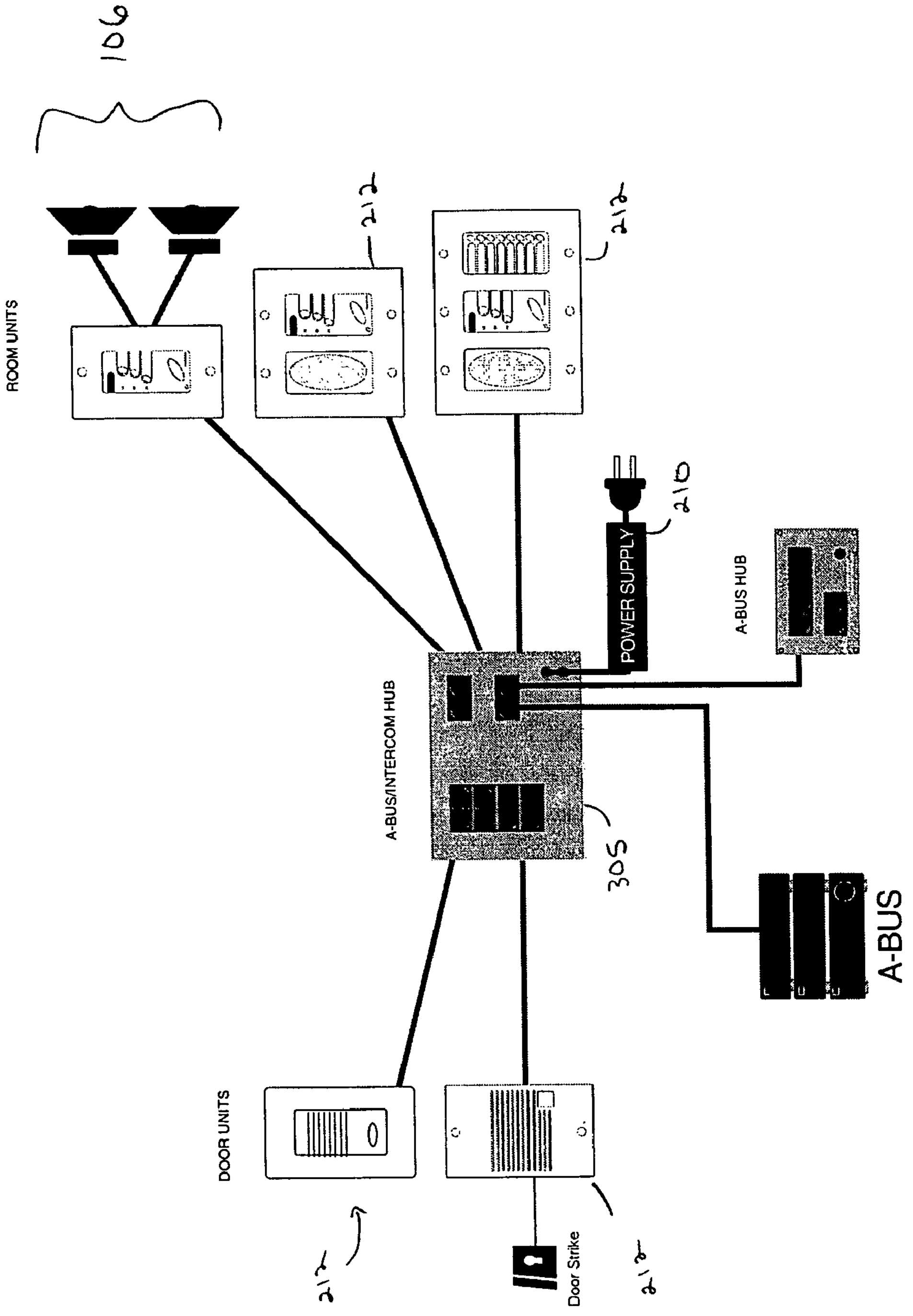
FIG. 10 is schematic diagram illustrating a combination distributed stereo audio system/intercom system according to the invention.

As illustrated in FIG. 10, a combined music/intercom system can be provided utilizing the distributed audio concepts illustrated and described above. In particular, an A-BUS audio processor can be located in the A-BUS/intercom hub 305, which processor takes up to 4 A-BUS ready inputs (this can be other special interface devices as well) and routes them to an A-BUS output socket, and optionally onto a pair of "Y" lines of the cross-point switch. This is also where the A-BUS "ducking" (reduction of music source volume during intercom usage) takes place for muting A-BUS when required.

In a fully digital version of the system, audio signals may be transmitted as digital information. In such a system, the cabling would be able to carry the audio signals as well as control/data signals (either in separate twisted pairs or in combined format along a single twisted pair) to all modules/speakers throughout the system, and each of the various modules will be able to "pick off" the data intended for it.

Finally, in another embodiment (not illustrated), a combined speaker/microphone could be used with a single, dual-function transducer. In such an embodiment, a single twisted pair of wires within the cabling would carry audio signals back and forth between the intercom hub and the remote module, thus leaving an extra twisted pair for the transmission of other signals.

Cabling For Use With The Invention

As specified above, the various embodiments of the invention utilize category 5 cabling or similar to provide power and at least one audio signal from the central audio unit (e.g., a source of stereo audio signals or a central intercom hub) to a remote unit (e.g., a stereo amplifier and speakers or at least two intercom speaker/amplifier units or modules). This section of the application elucidates what is meant by category 5 cabling or similar.

In the Underwriters Labs (UL) Level classification system, there are several levels of increasing quality cabling.

In work paralleling UL's efforts, the American National Standards Institute's (ANSI) Electronic Industry Association/Telecommunication Industry Association (EIA/TIA) has developed similar standards to rate UTP.

The UL system harmonized with the EIA/TIA category system, and UL categories 3-5 now correspond exactly to EIA/TIA 568A categories.

EIA/TIA 568A incorporates all of the relevant areas of 568, TSB-36, TSB-40A, and TSB-53. The standard covers 100 ohm UTP, 150 ohm STP, and fiber optic cabling. The EIA/TIA category rating system identifies categories 3, 4, and 5 for data applications.

Category 5 applies to UTP cables and associated connecting hardware with transmission characteristics up to 100 MHz. Its application is ATM over copper TP-PMD 100Base-X.

Most field test equipment verify category 5 conformance by checking the link's performance against EIA/TIA 568A Annex E requirements.

In addition to category 5 cabling, the invention contemplates use of "similar" cabling. For example, category 5e cabling is also contemplated for use with the invention. Category 5e cabling is, like category 5 cabling, four twisted pair cabling, but with a higher twist rate to enable higher frequency response. Category 6 cabling is also anticipated, and use of category 6 cabling would also be within the scope of the invention. Category 6 cabling is, like category 5 and 5e cabling, four twisted pair cabling, but with a cross-shaped insulating dielectric between the four twisted pairs. The frequency response of category 6 cabling is even higher. Category 7 cabling is also known, and use of it, too, is within the scope of the invention.

In general, these various categories of cabling are high-speed cabling that have been developed for the data handling industry (e.g., for computer network applications). They are characterized by four twisted pairs of relatively fine gauge wiring (on the order of 22 or 24 AWG) that, prior to the present invention, was considered unsuitable for the transmission of audio signals and power. As the category number of the cabling increases, the frequency of the cabling generally increases. Thus, in a broader sense, the invention is deemed to cover the use of four pair twisted cabling that has the frequency response of category 5 cable or higher.

The attached appendix provides exemplary standards regarding the performance characteristics of categories 5, 5e, 6, and 7, use of which is covered by the present invention (categories 5e, 6, and 7 being deemed to be "similar" as that term has been used throughout this patent and its parent).

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A distributed audio system, comprising:

a central audio unit;

a first speaker located remote from the central audio unit; and a power supply;

wherein said first speaker is connected to said central audio unit via a first length of four twisted pair cabling which is able to transmit data signals at a frequency of at least 100 MHz;

audio signals travel from said central audio unit to said first speaker along a first twisted pair of said first length of cabling; and power travels from said power supply to said first speaker along a second twisted pair of said first length cabling.

2. The distributed audio system of claim 1, wherein said four pair twisted cabling is selected from the group consisting of category 5 cabling, category 5e cabling, category 6 cabling, and category 7 cabling.

3. The distributed audio system of claim 1, wherein said central audio unit comprises a source of audio signals;

said distributed audio system further comprises a second speaker located remote from said central audio unit and connected to said central audio unit by said first length of four twisted pair cabling;

power travels from said power supply to said second speaker along said second twisted pair of said first length of four twisted pair cabling; and audio signals travel from said central audio unit to said second speaker along a third twisted pair of said first length of four twisted pair cabling.

4. The distributed audio system of claim 3, wherein said central audio unit comprises, in combination, said source of audio signals and an audio hub to which said source of stereo audio signals is connected via a second length of four twisted pair cabling which is able to transmit data signals at a frequency of at least 100 MHz, and wherein said first and second speakers are connected to said source of stereo audio signals via said audio hub.

5. The distributed audio system of claim 3, further comprising an amplifier that is located remote from said central audio unit and that drives said speakers, power and audio signals passing to said first and second speakers via said amplifier.

6. The distributed audio system of claim 1, wherein said distributed audio system is an intercom system and said central audio unit is an intercom hub;

said distributed audio system further comprises a first microphone located remote from said central audio unit and generally at the same location as said first speaker, a second speaker located remote from said central audio unit and at a location other than the location of said first speaker and said first microphone, and a second microphone located remote from said central audio unit and generally at the same location as said second speaker;

said first microphone is also connected to said central audio unit via said first length of four twisted pair cabling;

said second speaker and said second microphone are connected to said central audio unit via a second length of four twisted pair cabling;

power travels to said first microphone along said first length of four twisted pair cabling; and power travels to said second speaker and to said second microphone along said second length of four twisted pair cabling.

7. The distributed audio system of claim 6, wherein audio signals travel from said first microphone to said central audio unit along a third twisted pair in said first length of four twisted pair cabling.

8. The distributed audio system of claim 7, wherein audio signals travel from said central audio unit to said second speaker and audio signals travel from said second microphone to said central audio unit along separate twisted pairs in said second length of four twisted pair cabling.

9. The distributed audio system of claim 1, wherein said first speaker is housed within a module and wherein control data travels between said central audio unit and said module along said first length of cabling.

10. The distributed audio system of claim 1, wherein said audio signals are digital signals.

11. A distributed audio system, comprising:

a central audio unit;

a first speaker located remote from the central audio unit; and a power supply;

wherein said first speaker is connected to said central audio unit via a first length of four twisted pair cabling which is able to transmit data signals at a frequency of at least 100 MHz;

audio signals travel from said central audio unit to said first speaker along said first length of cabling; and power travels from said power supply to said first speaker along said first length cabling.

12. The distributed audio system of claim 1, wherein said four pair twisted cabling is selected from the group consisting of category 5 cabling, category 5e cabling, category 6 cabling, and category 7 cabling.

13. The distributed audio system of claim 11, wherein said central audio unit comprises a source of audio signals;

said distributed audio system further comprises a second speaker located remote from said central audio unit and connected to said central audio unit by said first length of four twisted pair cabling;

power travels from said power supply to said second speaker along said first length of four twisted pair cabling; and audio signals travel from said central audio unit to said second speaker along said first length of four twisted pair cabling.

14. The distributed audio system of claim 13, wherein said central audio unit comprises, in combination, said source of audio signals and an audio hub to which said source of stereo audio signals is connected via a second length of four twisted pair cabling which is able to transmit data signals at a frequency of at least 100 MHz, and wherein said first and second speakers are connected to said source of stereo audio signals via said audio hub.

15. The distributed audio system of claim 13, further comprising an amplifier that is located remote from said central audio unit and that drives said speakers, power and audio signals passing to said first and second speakers via said amplifier.

16. The distributed audio system of claim 11, wherein said distributed audio system is an intercom system and said central audio unit is an intercom hub;

said distributed audio system further comprises a first microphone located remote from said central audio unit and generally at the same location as said first speaker, a second speaker located remote from said central audio unit and at a location other than the location of said first speaker and said first microphone, and a second microphone located remote from said central audio unit and generally at the same location as said second speaker;

said first microphone is also connected to said central audio unit via said first length of four twisted pair cabling;

said second speaker and said second microphone are connected to said central audio unit via a second length of four twisted pair cabling;

power travels to said first microphone along said first length of four twisted pair cabling; and power travels to said second speaker and to said second microphone along said second length of four twisted pair cabling.

17. The distributed audio system of claim 16, wherein audio signals travel from said first microphone to said central audio unit along said first length of four twisted pair cabling.

18. The distributed audio system of claim 17, wherein audio signals travel from said central audio unit to said second speaker and audio signals travel from said second microphone to said central audio unit along separate twisted pairs in said second length of four twisted pair cabling.

19. The distributed audio system of claim 11, wherein said first speaker is housed within a module and wherein control data travels between said central audio unit and said module along said first length of cabling.

20. The distributed audio system of claim 11, wherein said audio signals are digital signals.

* * * * *